US006867778B2

(12) United States Patent
Tang et al.

(10) Patent No.: US 6,867,778 B2
(45) Date of Patent: Mar. 15, 2005

(54) END POINT VALUE CORRECTION WHEN TRAVERSING AN EDGE USING A QUANTIZED SLOPE VALUE

(75) Inventors: Wing-Cheong Tang, Union City, CA (US); Michael G. Lavelle, Saratoga, CA (US); Mark E. Pascual, San Jose, CA (US); Patrick Shehane, Fremont, CA (US); Nandini Ramani, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/085,635

(22) Filed: Feb. 28, 2002

(65) Prior Publication Data

US 2003/0160790 A1 Aug. 28, 2003

(51) Int. Cl.[7] .............................................. G06T 11/20
(52) U.S. Cl. ........................ 345/441; 345/581; 345/606
(58) Field of Search ................................. 345/441–443, 345/606, 581

(56) References Cited

U.S. PATENT DOCUMENTS

| | | | | |
|---|---|---|---|---|
| 5,278,949 A | * | 1/1994 | Thayer | 345/426 |
| 5,528,737 A | * | 6/1996 | Sfarti | 345/441 |
| 5,544,294 A | * | 8/1996 | Cho et al. | 345/441 |
| 5,684,941 A | * | 11/1997 | Dye | 345/441 |
| 6,219,070 B1 | * | 4/2001 | Baker et al. | 345/475 |
| 6,285,376 B1 | * | 9/2001 | Choi et al. | 345/441 |
| 6,556,203 B1 | * | 4/2003 | Nelson | 345/443 |

OTHER PUBLICATIONS

Foley, James D., et al., *Computer Graphics: Principles and Practice*, 2nd Edition, Addison–Wesley Publishing Company, Jul. 1997, pp. 91–99 and 883–885.

* cited by examiner

Primary Examiner—Matthew C. Bella
Assistant Examiner—Po-Wei Chen
(74) Attorney, Agent, or Firm—Meyertons Hood Kivlin Kowert & Goetzel, P.C.; Jeffrey C. Hood

(57) ABSTRACT

A system and method for rendering a polygon, such as a triangle. The method may comprise receiving geometry data (or vertex data) defining vertices of the polygon. The method may compute initial vertex x,y values at end points proximate to each of the vertices of the polygon, and a slope value along each edge of the polygon. The computed slope may be a quantized slope value having a first number of bits of precision. The first number of bits of precision may produce inaccuracies for interpolated x,y values computed at the end points of an edge of the polygon. The method may then interpolate x,y values along each respective edge of the polygon using the computed slope along the respective edge of the polygon. Finally the method may store final x,y values for each respective edge of the polygon. The final x,y values comprise the interpolated x,y values for non-end points of the respective edge, and the computed initial vertex x,y values for each of the end points of the respective edge. The operation of storing the computed initial vertex x,y values for each of the end points of the respective edge, instead of using interpolated x,y values at the end points, operates to prevent inclusion of an extraneous pixel and/or exclusion of a pixel within the polygon.

22 Claims, 10 Drawing Sheets

END POINT VALUE CORRECTION WHEN TRAVERSING AN EDGE USING A QUANTIZED SLOPE VALUE

BACKGROUND OF THE INVENTION

1. Field of the Invention

This invention relates generally to the field of computer graphics and, more particularly, to rendering polygons.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modern graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from converters is conveyed to a display device such as a computer monitor, LCD display, or projector.

As noted above, the rendering process may include interpolating slopes of edges of the polygon or triangle, and then calculating pixels or samples based on these interpolated slopes. One problem that arises is that a graphics system typically does not use a large number of bits of precision in representing the slope value. Thus, quantization error in slope calculation may occur due to the limited number of precision bits used to represent the slope dxdy or dydx along the edge. The quantization error present in the slope value may result in an inaccurate traversal of the edge. The problem is especially salient when the two ends of an edge are located exactly on the integer grids. In this instance, as a result either too many or too few pixels could be drawn at one of the ends of the polygon edge. In a triangle mesh where vertices are defined on the integer grids, such errors often result in artifacts or "holes" that can be visually detected.

Therefore, an improved system and method is desired for rendering polygons with reduced errors.

SUMMARY OF THE INVENTION

One embodiment of the invention comprises a system and method for rendering a polygon. The polygon may be any of various types, such as a triangle. Embodiments of the present invention may operate to reduce inaccuracies in the rendered polygon, particularly at vertex end points of the polygon. The method may be used for each edge of a polygon, and for each of a plurality of polygons in a rendered image.

The method may comprise receiving geometry data (or vertex data) defining vertices of the polygon. Initial vertex x,y values at end points proximate to each of the vertices of the polygon may then be computed. A slope value along each edge of the polygon may also be computed. The computed slope may be a quantized slope value having a first number of bits of precision. The first number of bits of precision may produce inaccuracies for interpolated x,y values computed at the end points of at least one edge of the polygon.

The method may then comprise interpolating x,y values along each respective edge of the polygon. This interpolation uses the computed slope along the respective edge of the polygon. Finally the method may store final x,y values for each respective edge of the polygon. For each respective edge, storing the final x,y values comprises storing the interpolated x,y values for the respective edge of the polygon for non-end points of the respective edge, and storing the computed initial vertex x,y values for each of the end points of the respective edge. The final x,y values may comprise samples and/or pixels for the polygon.

In one embodiment, storing the computed initial vertex x,y values for each of the end points of the respective edge as the final x,y values comprises replacing interpolated x,y values at the end points with the computed initial vertex x,y values. The operation of storing the computed initial vertex x,y values for each of the end points of the respective edge, instead of using interpolated x,y values at the end points, operates to prevent inclusion of an extraneous pixel and/or exclusion of a pixel within the polygon.

One embodiment of a system for rendering a polygon may comprise a vertex processor, a render system, and a memory. The vertex processor is operable to receive vertex data defining vertices of a polygon and assemble the vertex data. The vertices may include a first vertex and a second vertex. The render system may comprise a setup unit which sets up the polygon, and at least one edge walker and/or span walker for interpolating x,y values along an edge of the polygon.

The render system receives the assembled vertex data and is operable to: 1) compute initial vertex x,y values for end points proximate to the first vertex and the second vertex of the polygon; 2) calculate a slope value along a first edge of the polygon located between the first vertex and the second vertex; 3) interpolate x,y values along the first edge of the polygon between the first vertex and the second vertex, wherein the interpolation uses the calculated slope value along the first edge of the polygon; and 4) store final x,y values for the first edge of the polygon in the memory. In storing the final x,y values, the render system is operable to store the interpolated x,y values for non-end points of the first edge and store the computed initial vertex x,y values for each of the end points of the first edge. The render system may perform the above operations for each of the edges of the polygon. The system described herein may also operate for each of a plurality of polygons.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
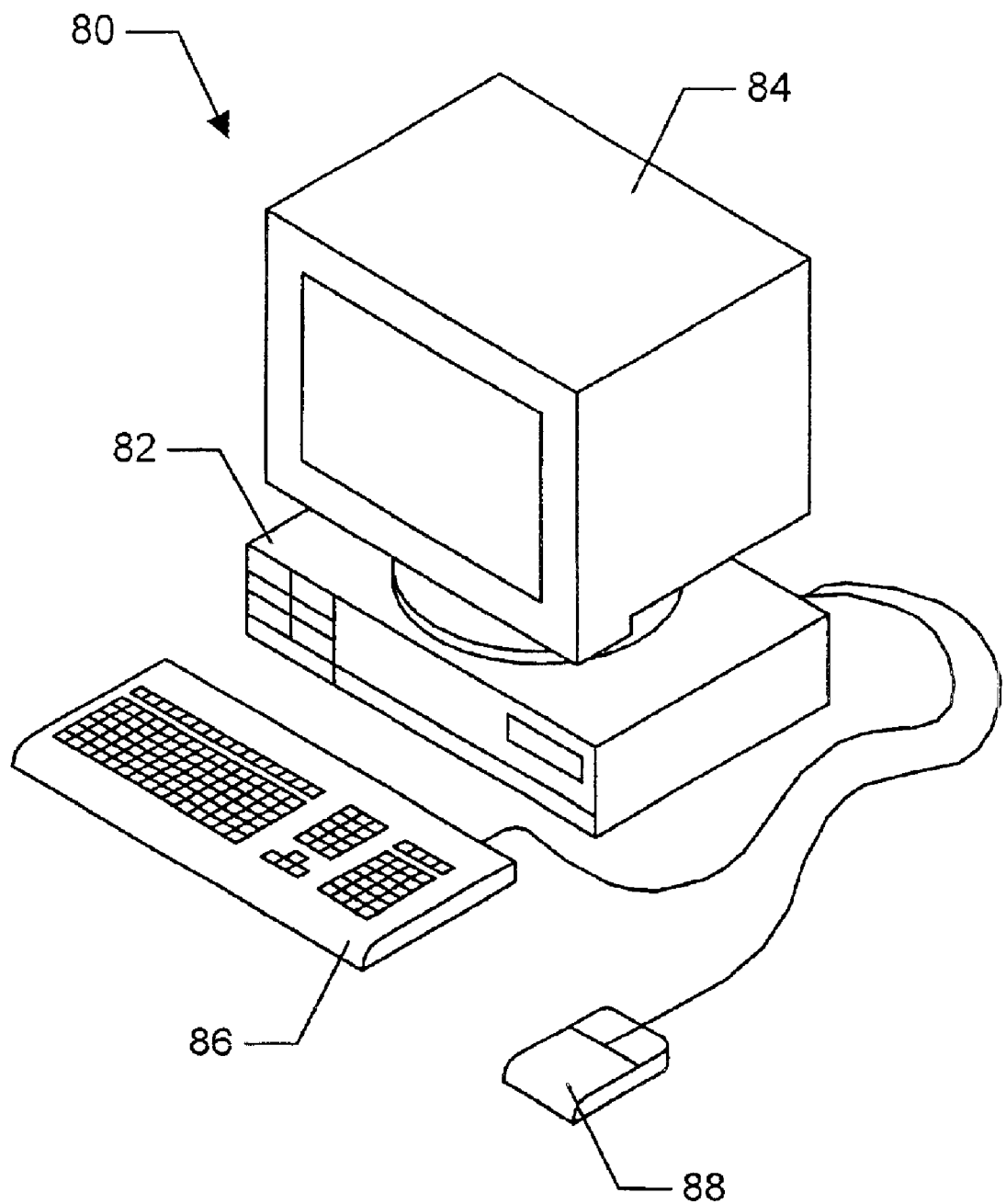
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
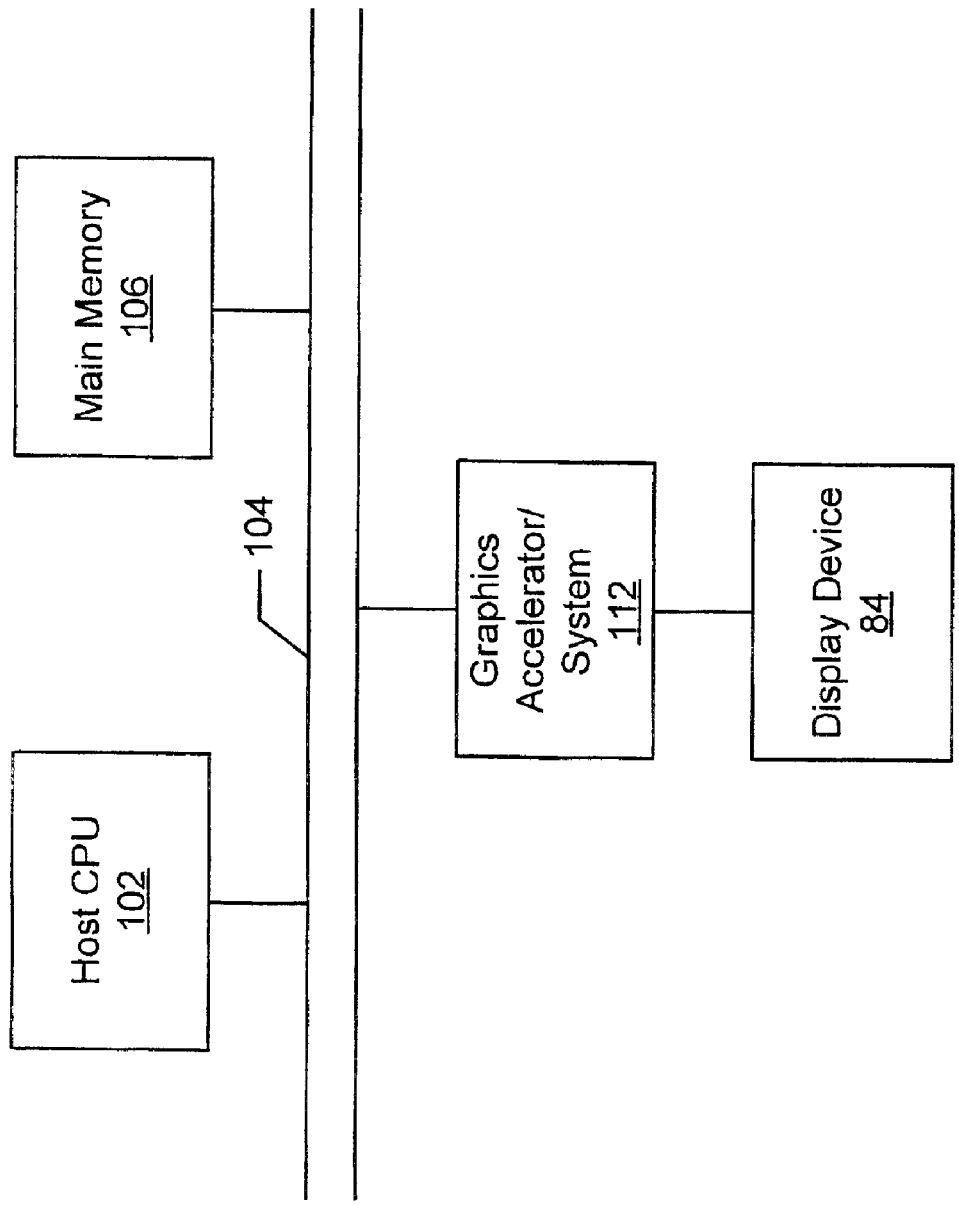
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
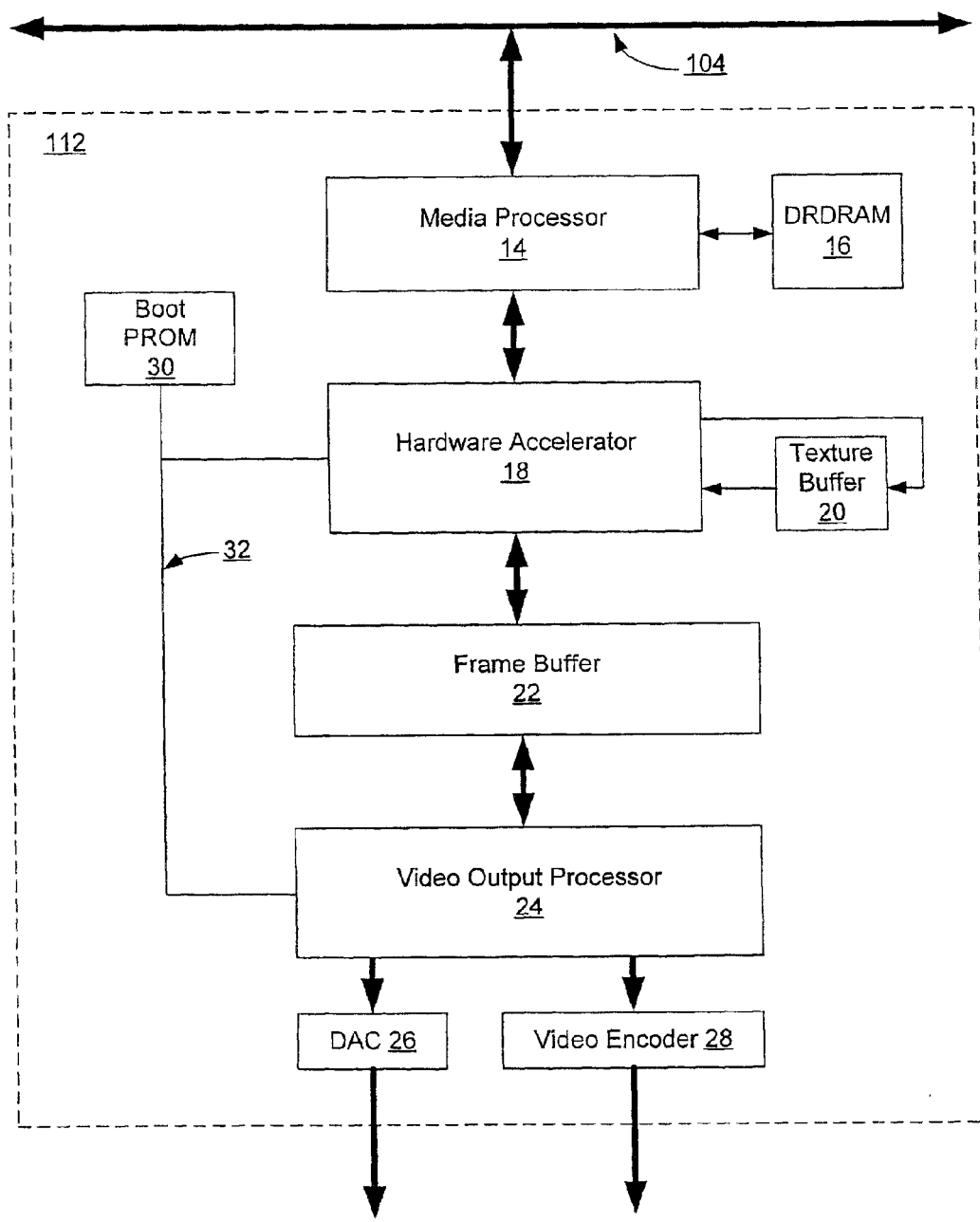
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
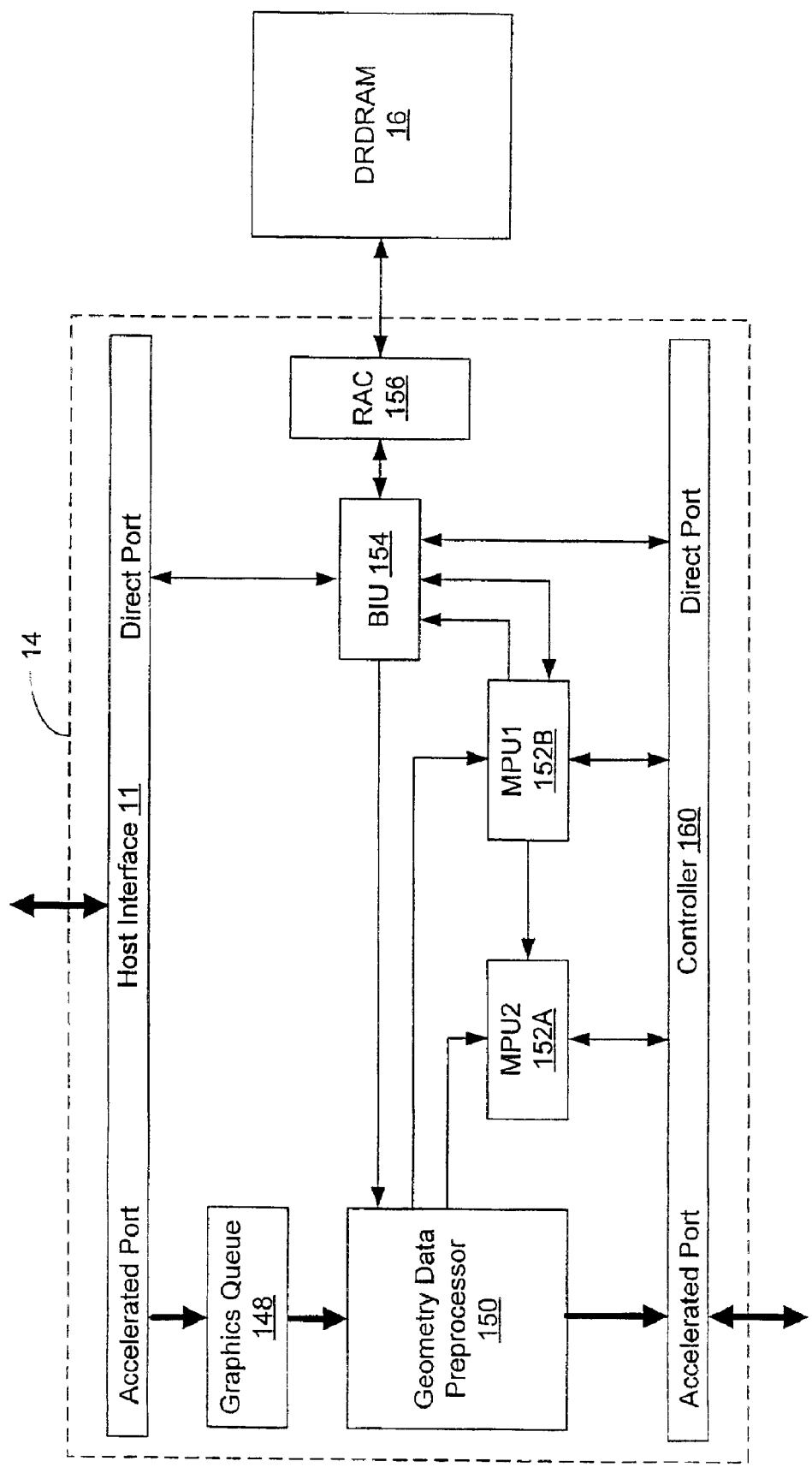
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappinga (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
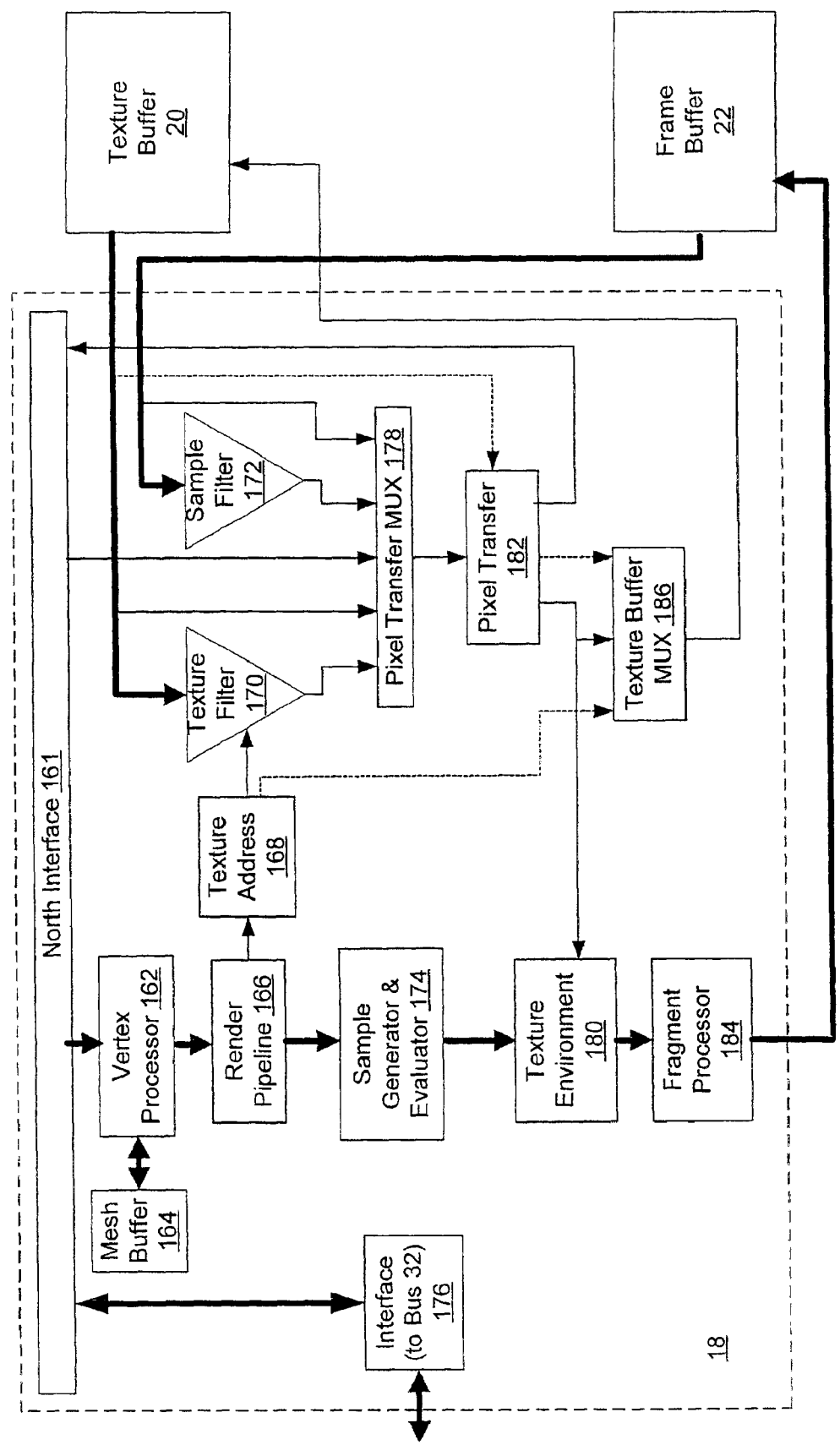
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);
r2, g2, b2 (i.e., red, green, and blue specular color from lit textures);
alpha (i.e. transparency);
z (i.e. depth); and
s, t, r, and w (i.e. texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3D-RAM memory devices (e.g. 3D-RAM64 memory devices) manufactured by Mitsubishi Electric Corporation. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and sample buffer.

Figure 6:
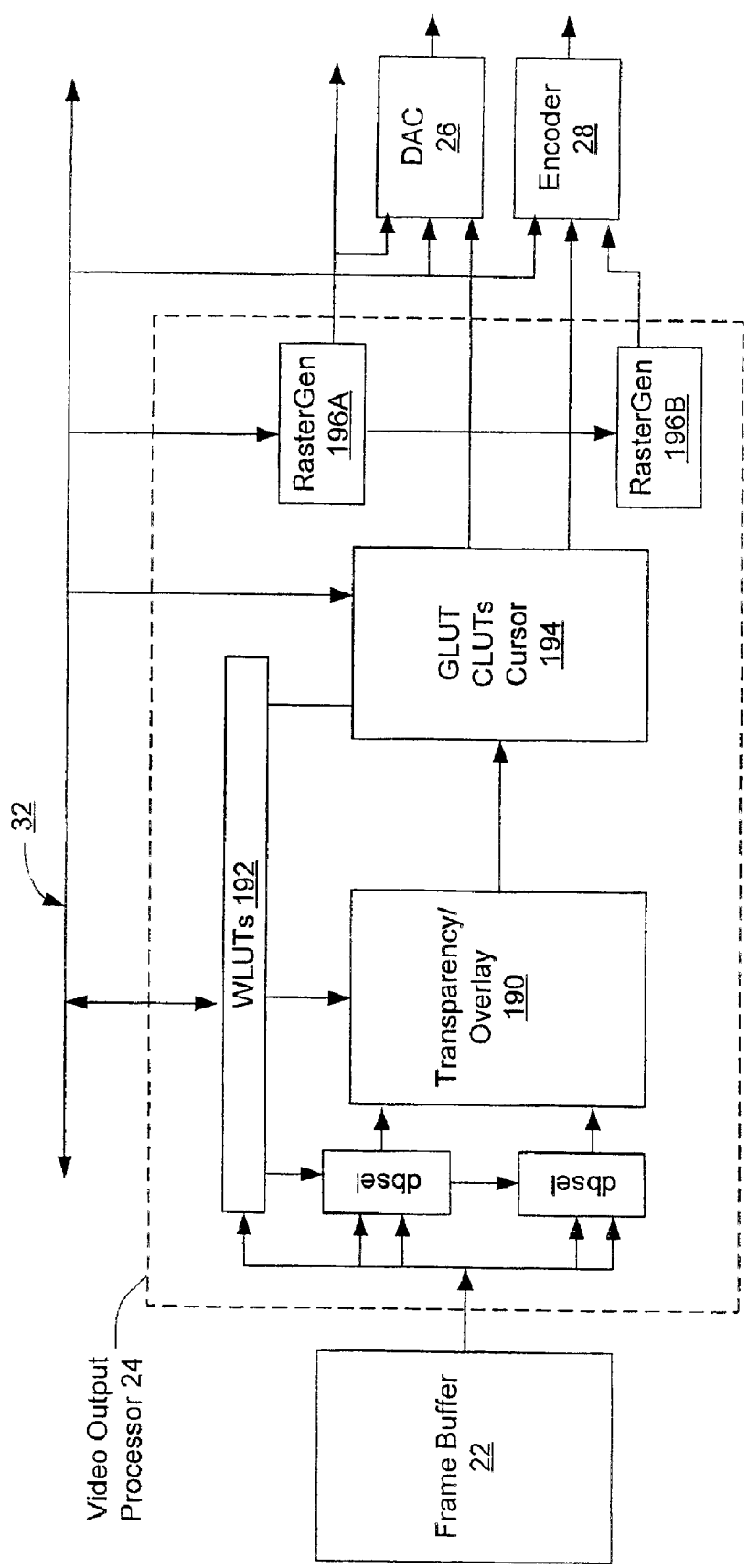
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
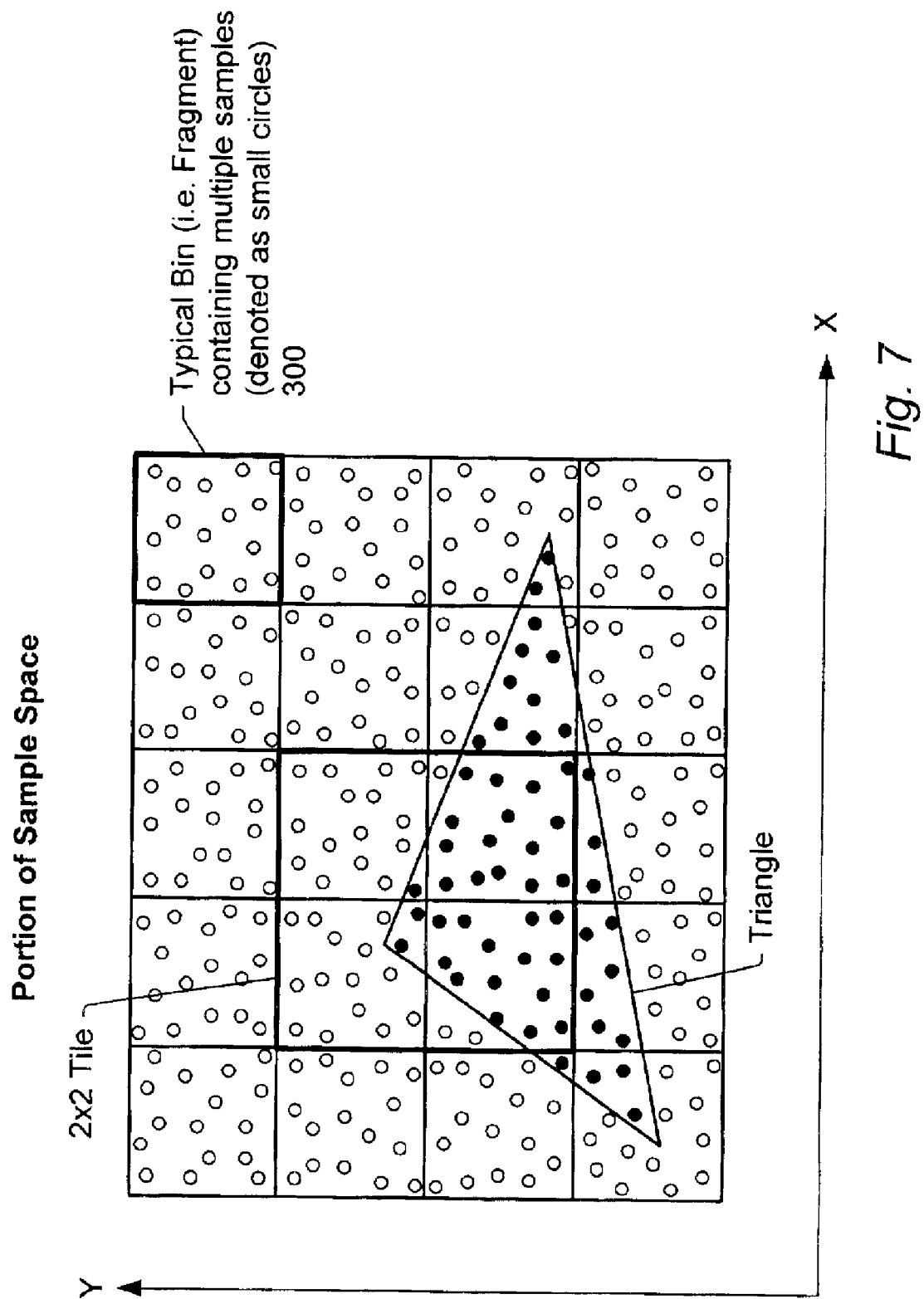
FIG. 7 illustrates rendering samples or pixels in a polygon, e.g., a triangle.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g. bin 300) as illustrated in FIG. 7. Each bin may contain one or more samples. The number of samples per bin may be a programmable parameter.

Figure 8:
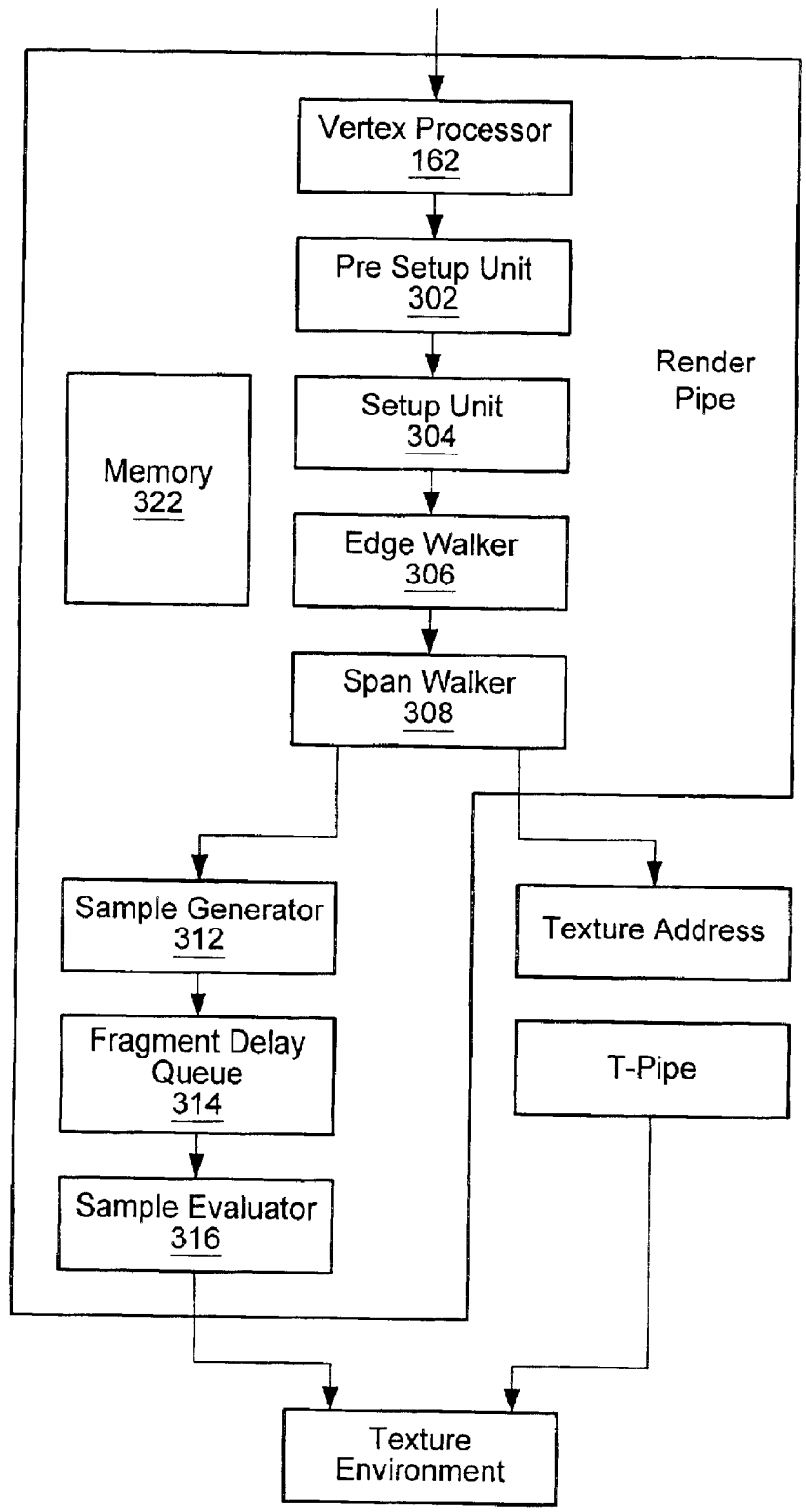
FIG. 8 is a more detailed block diagram of the render pipeline of FIG. 5.

FIG. 8—Render Pipeline

FIG. 8 illustrates a more detailed block diagram of one embodiment of the render system or render pipeline 166. As shown, the render pipeline 166 may comprise a Vertex Processor (VP) 162, a Pre-Setup Unit (PSU) 302, a Setup Unit (SU) 304, an Edge Walker (EW) 306, and Span Walkers (SW) 308. The render pipeline 166 may also comprise a Sample Generator (SG) 312, a Fragment Delay Queue (FDQ) 314, and a Sample Evaluator (SE) 316. The render pipeline 166 may also comprise a memory 322.

The Vertex Processor 162 operates to assemble the received vertices. The vertex information may be received from the host computer.

The Pre-Setup Unit 302 operates to pre-process vertex data.

The Setup Unit 304 operates to set up the triangle.

The Edge Walker 306 operates to interpolate along the controlling edge of a polygon or triangle.

The Span Walker 308 operates to interpolate along the subordinate edges of a polygon or triangle.

Figure 10:
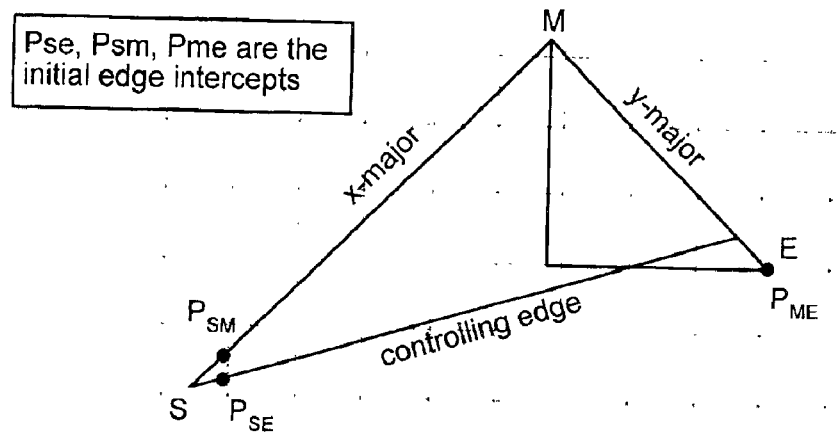
FIG. 10 illustrates; interpolation of edges on a triangle.
Figure 10:
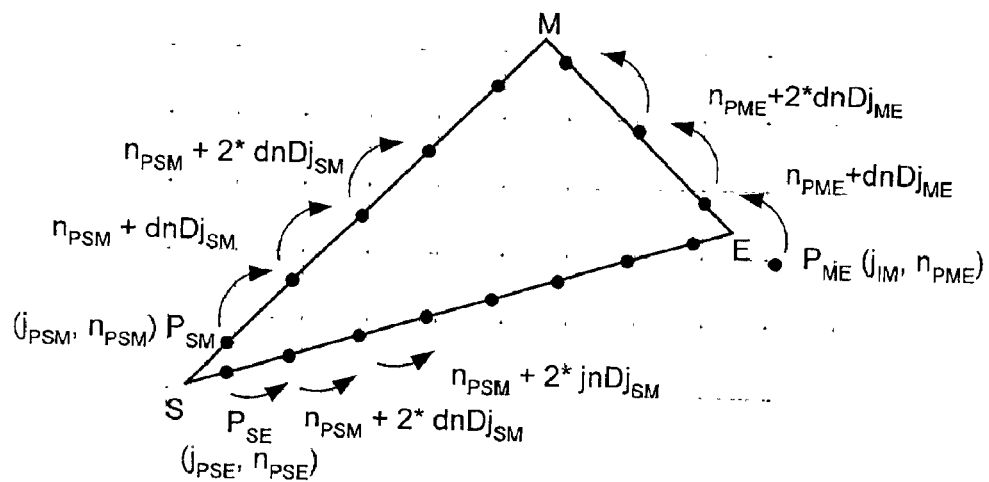

FIG. 10 illustrates steps involved in rendering a triangle. The vertex data (x,y,z,r,g,b . . . ) sent by the host is assembled in the VP 162. The SU 304 then sets up the triangle for rendering. This includes computing initial intercepts along each edge and the slope along each edge. The EW 306 interpolates the x,y and related component values along the controlling edge. The controlling edge is the edge with the max(dx,dy). For each span issued by the EW 306, the SW 308 interpolates from the controlling to the subordinate edges.

Figure 11:
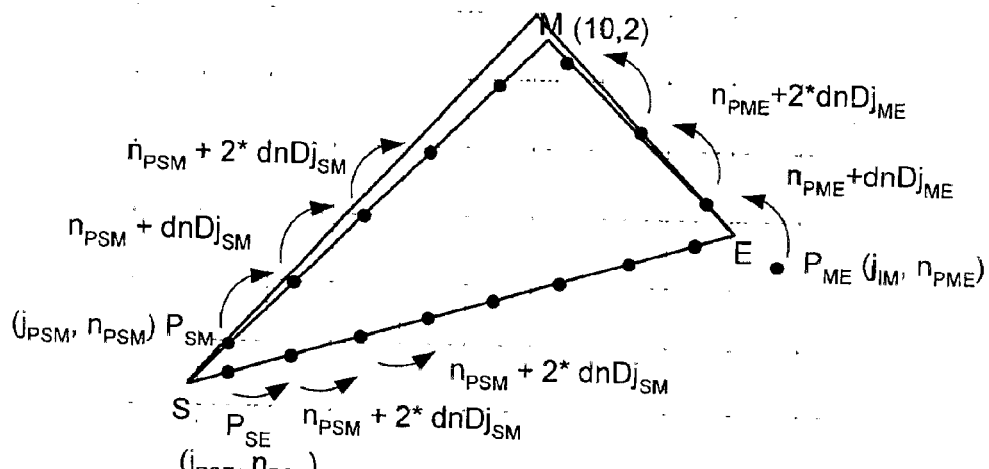
FIG. 11 illustrates interpolation of edges on a triangle, wherein a slope quantization error results in a difference in the actual and perceived edge of the triangle.

Quantization error in slope calculation occurs due to the limited number of precision bits used to represent the slope dxdy or dydx along the edge. In cases where the mid or end vertices of a triangle lie on (or possibly close to) a grid point, this could result in the inclusion of an extraneous pixel or exclusion of a pixel within the triangle. This will result in imperfect meshing of triangles. This is shown in FIG. 11, which demonstrates the actual and perceived edge. The thicker edge is the actual edge of the triangle and the lighter edge is the interpolated edge after traversal. As seen, the vertex M of the triangle located at (10,2) should ideally include the pixel (10,2) as part of the triangle. Due to inaccuracy in slope values and the interpolation of these inaccurate values, the pixel at (10,2) may be dropped. This would result in an artifact or "hole" in the rendered image.

In one embodiment of the invention, the system operates to use the defined values (the computed initial vertex x,y values) for the end points. The walking of the edge starts from one end point, adding the quantized slope value along the way, and when the other end is reached, the user defined value (the computed initial vertex x,y value) for that end point is used to replace the interpolated value. This method of "snapping" back to the original defined location eliminates all the holes in a triangle mesh that could have resulted otherwise. This scheme removes or prevents holes in triangle meshes. In the above case, the interpolated value (9.xxx,2.xxx) is replaced with (10,2). This will assure the proper rendering of the triangle.

Figure 9:
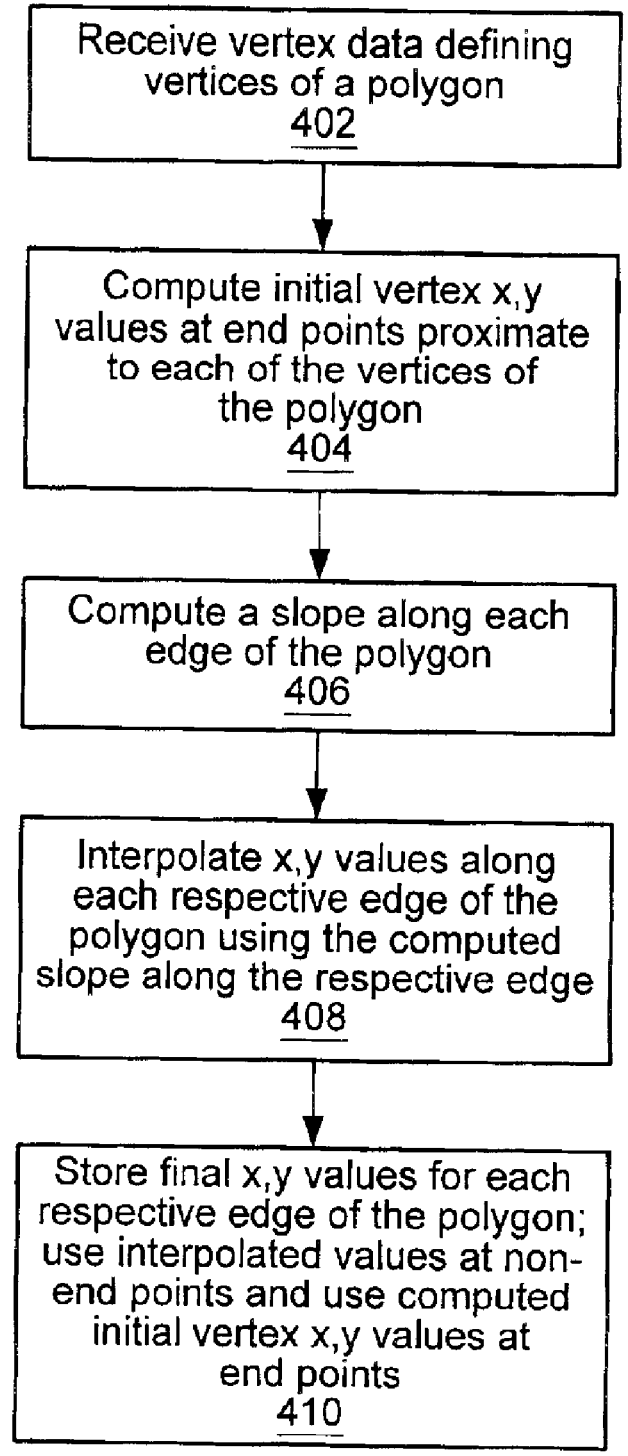
FIG. 9 is a flowchart diagram illustrating operation of one embodiment of the invention.

FIG. 9—Flowchart Diagram

FIG. 9 is a flowchart diagram illustrating one embodiment of the method of the invention. As shown, one embodiment of the invention comprises a system and method for rendering a polygon, e.g., rendering samples or pixels within the polygon. The polygon may be any of various types, such as a triangle. Embodiments of the present invention may operate to reduce inaccuracies in the rendered polygon, particularly at vertex end points of the polygon. The method may be used for each edge of a polygon, and for each of a plurality of polygons in a rendered image. It is noted that various of the steps in the flowchart may occur concurrently, or in various orders. Further, additional steps may be added, or some steps may be omitted or combined, as desired.

In step 402 geometry data (or vertex data) defining vertices of the polygon may be received. The term "vertex data" refers to information describing a vertex of a polygon, including one or more of color information, position information, normal information, alpha information, etc. The term "geometry data" may be used synonymously with vertex data.

In step 404 the method may compute initial vertex x,y values at end points proximate to each of the vertices of the polygon.

In step 406 the method may compute a slope value along each edge of the polygon may also be computed. The computed slope may be a quantized slope value having a first number of bits of precision. The first number of bits of precision may produce inaccuracies for interpolated x,y values computed at the end points of at least one edge of the polygon.

In step 408 the method may then interpolate x,y values along each respective edge of the polygon. This interpolation uses the computed slope along the respective edge of the polygon.

In step 410 the method may store final x,y values for each respective edge of the polygon. For each respective edge, storing the final x,y values may comprise storing the interpolated x,y values for the respective edge of the polygon for non-end points of the respective edge, and storing the computed initial vertex x,y values for each of the end points of the respective edge. The final x,y values may comprise samples and/or pixels for the polygon. In one embodiment, storing the computed initial vertex x,y values for each of the end points of the respective edge as the final x,y values comprises replacing interpolated x,y values at the end points with the computed initial vertex x,y values. The operation of storing the computed initial vertex x,y values for each of the end points of the respective edge, instead of using interpolated x,y values at the end points, operates to prevent inclusion of an extraneous pixel and/or exclusion of a pixel within the polygon.

One embodiment of a system for rendering a polygon may comprise the vertex processor 162, the render system 166 as described above, and the memory 322 (which may be considered part of the render system 166). The vertex processor 162 is operable to receive vertex data defining vertices of a polygon and assemble the vertex data. The vertices may include a first vertex and a second vertex.

The render system 166 receives the assembled vertex data and is operable to: 1) compute initial vertex x,y values for end points proximate to the first vertex and the second vertex of the polygon; 2) calculate a slope value along a first edge of the polygon located between the first vertex and the second vertex; 3) interpolate x,y values along the first edge of the polygon between the first vertex and the second vertex, wherein the interpolation uses the calculated slope value along the first edge of the polygon; and 4) store final x,y values for the first edge of the polygon in the memory. In storing the final x,y values, the render system 166 is operable to store the interpolated x,y values for non-end points of the first edge and store the computed initial vertex x,y values for each of the end points of the first edge. The render system 166 may perform the above operations for each of the edges of the polygon. The system described herein may also operate for each of a plurality of polygons.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for rendering a polygon, the method comprising:
   receiving geometry data defining vertices of the polygon,
   computing initial vertex x,y values at end points proximate to each of the vertices of the polygon, wherein the end points define the outer edges of the first and last span that traverse the polygon;
   computing a slope along each edge of the polygon, wherein said computing a slope introduces an error in each computed slope value due to the limited number of precision bits used to represent the slope value;
   interpolating equally spaced x,y values along each respective edge of the polygon, wherein each of the x,y values specify the edge of sequential spans traversing the polygon, wherein said interpolating uses the computed slope along the respective edge of the polygon, and wherein the last x,y values in the sequence for each edge have an accumulated error due to the error in each respective computed slope value; and
   storing final x,y values for each respective edge of the polygon, wherein, for each respective edge, said storing final x,y values comprises storing the interpolated x,y values for non-end points of the respective edge, and said storing final x,y values comprises storing the computed initial vertex x,y values for at least one of the end points of the respective edge, instead of the corresponding last interpolated x,y values.

2. The method of claim 1, wherein said storing the computed initial vertex x,y values for either or both of the end points of the respective edge comprises replacing interpolated x,y values at the end points with the corresponding computed initial vertex x,y values.

3. The method of claim 1, wherein said storing the computed initial vertex x,y values for at least one of the end points of the respective edge operates to prevent inclusion of an extraneous pixel and/or exclusion of a pixel within the polygon.

4. The method of claim 1, wherein the computed slope is a quantized slope value.

5. The method of claim 1, wherein the slope value is represented by a quantized value having a first number of bits of precision, wherein the first number of bits of precision produce inaccuracies for interpolated x,y values computed at the end points of at least one edge of the polygon.

6. The method of claim 1, wherein the polygon is a triangle.

7. A method for rendering a polygon, the method comprising:
   receiving vertex data defining vertices of a polygon, wherein the vertices include a first vertex and a second vertex;
   computing initial vertex x,y values for end points proximate to the first vertex and the second vertex of the polygon, wherein the end points define the outer edges of the first and last span that traverse the polygon;
   calculating a slope value along a first edge of the polygon located between the first vertex and the second vertex, wherein said computing a slope introduces an error in the computed slope value due to the limited number of precision bits used to represent the slope value;
   interpolating an equally spaced sequence of x,y values along the first edge of the polygon between the first vertex and the second vertex, wherein each of the x,y values specify the edge of a span traversing the polygon, wherein said interpolating uses the calculated slope value along the first edge of the polygon, and wherein the last x,y values in the sequence for the first edge have an accumulated error due to the error in the computed slope value; and
   storing final x,y values for the first edge of the polygon, wherein said storing final x,y values comprises storing the interpolated x,y values for non-end points of the first edge, and storing the corresponding computed initial vertex x,y values for at least one of the end points of the first edge.

8. The method of claim 7, wherein said computing, said calculating, said interpolating, and said storing are performed for each of the edges of the polygon.

9. The method of claim 7, wherein said storing the computed initial vertex x,y values for each of the end points of the first edge comprises replacing interpolated x,y values at the end points with the computed initial vertex x,y values.

10. The method of claim 7, wherein said storing the computed initial vertex x,y values for each of the end points of the first edge operates to prevent inclusion of an extraneous pixel and/or exclusion of a pixel within the polygon.

11. The method of claim 7, wherein the slope value is a quantized slope value.

12. The method of claim 7, wherein the slope value is represented by a quantized value having a first number of bits of precision, wherein the first number of bits of precision produce inaccuracies for interpolated x,y values computed at the end points of the first edge of the polygon.

13. The method of claim 7, wherein the polygon is a triangle.

14. A system for rendering a polygon, the system comprising:
   a vertex processor operable to receive vertex data defining vertices of a polygon, wherein the vertices comprise a first vertex and a second vertex, and wherein the vertex processor is operable to assemble the vertex data;
   a render system coupled to the vertex processor to receive the assembled vertex data; and
   a memory coupled to the render system;
   wherein the render system is operable to:
      compute initial vertex x,y values for end points proximate to the first vertex and the second vertex of the polygon, wherein the end points define the outer edges of the first and last span that traverse the polygon;
      calculate a slope value along a first edge of the polygon located between the first vertex and the second vertex, wherein said computing a slope introduces an error in the computed slope value due to the limited number of precision bits used to represent the slope value;

interpolate an equally spaced sequence of x,y values along the first edge of the polygon between the first vertex and the second vertex, wherein each of the x,y values specify the edge of a span traversing the polygon, wherein said interpolating uses the calculated slope value along the first edge of the polygon, and wherein the last x,y values in the sequence for the first edge have an accumulated error due to the error in the computed slope value; and store final x,y values for the first edge of the polygon in the memory, wherein, in storing the final x,y values, the render system is operable to store the interpolated x,y values for non-end points of the first edge and store the computed initial vertex x,y values for at least one of the end points of the first edge.

15. The system of claim 14, wherein, in storing the computed initial vertex x,y values for each of the end points of the first edge, the render system is operable to replace interpolated x,y values at the end points with the computed initial vertex x,y values.

16. The system of claim 14, wherein storage of the computed initial vertex x,y values for either or both of the end points of the first edge operates to prevent inclusion of an extraneous pixel and/or exclusion of a pixel within the polygon.

17. The system of claim 14, wherein the slope value is represented by a quantized value having a first number of bits of precision, wherein the first number of bits of precision produce inaccuracies for interpolated x,y values computed at the end points of the first edge of the polygon.

18. The system of claim 14, wherein the polygon is a triangle.

19. The system of claim 14, wherein the render system comprises at least one edge walker for interpolating the x,y values along the first edge of the polygon.

20. A system for rendering a polygon, the system comprising:

means for receiving geometry data defining vertices of the polygon, means for computing initial vertex x,y values at end points proximate to each of the vertices of the polygon, wherein the end points define the outer edges of the first and last span that traverse the polygon;

means for computing a slope along each edge of the polygon, wherein said computing a slope introduces an error in each computed slope value due to the limited number of precision bits used to represent the slope value;

means for interpolating equally spaced x,y values along each respective edge of the polygon, wherein each of the x,y values specify the edge of sequential spans traversing the polygon, wherein said interpolating uses the computed slope along the respective edge of the polygon, and wherein the last x,y values in the sequence for each edge have an accumulated error due to the error in each respective computed slope value; and means for storing final x,y values for each respective edge of the polygon, wherein, for each respective edge, said storing final x,y values comprises storing the interpolated x,y values for non-end points of the respective edge, and storing the corresponding computed initial vertex x,y values for at least one of the end points of the respective edge.

21. A method for rendering a polygon, the method comprising:

receiving geometry data defining vertices of the polygon, computing initial vertex x,y values at end points proximate to each of the vertices of the polygon that correspond to the intersections of a first and last scan line with the edges or extensions of the edges;

computing a slope along each edge of the polygon, wherein said computing a slope introduces an error in the computed slope value due to the limited number of precision bits used to represent the slope value;

interpolating x,y values at stepping points along each respective edge of the polygon that correspond to the intersections of additional scan lines with the edge, wherein said interpolating uses the computed slope along the respective edge of the polygon, and wherein the error in stepping point location due to the error in the computed slope accumulates for each stepping point along the edge;

storing final x,y values for each respective edge of the polygon, wherein, for each respective edge, said storing final x,y values comprises storing the interpolated x,y values for non-end stepping points of the respective edge, and said storing final x,y values comprises storing the computed initial vertex x,y values at end points proximate to each of the vertices of the polygon for each of the first and last end stepping points of the respective edge, wherein said operation of storing the computed initial vertex x,y values for each of the end points of the respective edge, instead of using interpolated x,y values at the end points, operates to prevent inclusion of an extraneous pixel that is outside the polygon and/or exclusion of a pixel that is within the polygon due to the accumulated error in the last interpolated stepping points for each edge.

22. A method for rendering a polygon, the method comprising:

receiving geometry data defining vertices of the polygon, computing initial vertex x,y values at end points proximate to each of the vertices of the polygon that are related to pixel grid locations;

computing a slope along each edge of the polygon, wherein said computing a slope introduces an error in the computed slope value due to the limited number of precision bits used to represent the slope value;

interpolating x,y values at stepping points approximating pixel grid locations along each respective edge of the polygon, wherein said interpolating uses the computed slope along the respective edge of the polygon, and wherein the error in stepping point location due to the error in the computed slope accumulates for each stepping point along the edge;

storing final x,y values for each respective edge of the polygon, wherein, for each respective edge, said storing final x,y values comprises storing the interpolated x,y values for non-end stepping points of the respective edge, and said storing final x,y values comprises storing the computed initial vertex x,y values at end points proximate to each of the vertices of the polygon for each of the first and last end stepping points of the respective edge, wherein said operation of storing the computed initial vertex x,y values for each of the end points of the respective edge, instead of using interpolated x,y values at the end points, operates to prevent inclusion of an extraneous pixel that is outside the polygon and/or exclusion of a pixel that is within the polygon due to the accumulated error in the last interpolated stepping points for each edge.

* * * * *